United States Patent
Clarke

(10) Patent No.: US 10,059,464 B2
(45) Date of Patent: Aug. 28, 2018

(54) POSITION SENSOR SYSTEM FOR A LANDING GEAR ASSEMBLY AND METHOD OF MONITORING

(71) Applicant: Sikorsky Aircraft Corporation, Stratford, CT (US)

(72) Inventor: Charles W. Clarke, Sag Harbor, NY (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 0 days.

(21) Appl. No.: 15/518,710

(22) PCT Filed: Oct. 15, 2015

(86) PCT No.: PCT/US2015/055694
§ 371 (c)(1),
(2) Date: Apr. 12, 2017

(87) PCT Pub. No.: WO2016/061323
PCT Pub. Date: Apr. 21, 2016

(65) Prior Publication Data
US 2017/0233096 A1    Aug. 17, 2017

Related U.S. Application Data

(60) Provisional application No. 62/064,150, filed on Oct. 15, 2014.

(51) Int. Cl.
*G01B 11/14*      (2006.01)
*B64D 45/00*      (2006.01)
(Continued)

(52) U.S. Cl.
CPC .......... *B64D 45/0005* (2013.01); *B64C 25/34* (2013.01); *B64C 25/60* (2013.01);
(Continued)

(58) Field of Classification Search
CPC ..... B64D 45/0005; B64C 25/34; B64C 25/60; B64C 27/06; G01D 5/34715; G01M 17/04
See application file for complete search history.

(56) References Cited

U.S. PATENT DOCUMENTS

| | | |
|---|---|---|
| 2,587,628 A | 4/1952 | King |
| 5,371,598 A | 12/1994 | Ghaem et al. |

(Continued)

OTHER PUBLICATIONS

International Search Report and Written Opinion of the International Search Authority dated Jan. 6, 2016, in related PCT Application No. PCT/US2015/055694, 9 pages.

(Continued)

*Primary Examiner* — Michael P Stafira
(74) *Attorney, Agent, or Firm* — Cantor Colburn LLP

(57) ABSTRACT

A position sensor system for a landing gear assembly includes a cylinder operatively coupled to an aircraft. Also included is a piston configured to translate within the cylinder. Further included is a pattern disposed on an outer surface of the piston. Yet further included is a scanner operatively coupled to the cylinder and positioned to optically detect the pattern during translation of the piston. Also included is a microprocessor in operative communication with the scanner and configured to receive data from the scanner for conversion to a quantity of movement of the piston relative to the cylinder.

12 Claims, 2 Drawing Sheets

(51) Int. Cl.
*G01M 17/04* (2006.01)
*B64C 25/34* (2006.01)
*B64C 25/60* (2006.01)
*B64C 27/06* (2006.01)
*G01D 5/347* (2006.01)

(52) U.S. Cl.
CPC .............. *B64C 27/06* (2013.01); *G01B 11/14* (2013.01); *G01D 5/34715* (2013.01); *G01M 17/04* (2013.01)

(56) References Cited

U.S. PATENT DOCUMENTS

| | | | |
|---|---|---|---|
| 6,120,009 | A | 9/2000 | Gatehouse et al. |
| 6,147,342 | A * | 11/2000 | Kucher ............... F15B 15/2846 250/231.13 |
| 7,034,527 | B2 | 4/2006 | Low et al. |
| 7,872,782 | B2 | 1/2011 | Sakakibara |
| 8,042,765 | B1 | 10/2011 | Nance |
| 2008/0033607 | A1* | 2/2008 | Zeliff ................. B64D 45/0005 701/31.4 |
| 2009/0026312 | A1 | 1/2009 | Hadley et al. |
| 2013/0114089 | A1 | 5/2013 | Jarisch et al. |
| 2013/0240664 | A1 | 9/2013 | Cox et al. |

OTHER PUBLICATIONS

European Search Report for related EP Application No. 15851414.1; dated May 15, 2018; 12 pages.

* cited by examiner

POSITION SENSOR SYSTEM FOR A LANDING GEAR ASSEMBLY AND METHOD OF MONITORING

CROSS-REFERENCE TO RELATED APPLICATIONS

The present application is a 371 National Stage of International Patent Application No. PCT/US2015/055694, filed on Oct. 15, 2015, which claims priority to U.S. Provisional Application No. 62/064,150, filed on Oct. 15, 2014, the contents of which are incorporated herein by reference in their entirety.

BACKGROUND OF THE INVENTION

The embodiments herein relate to landing gear assemblies for aircrafts and, more particularly, to a position sensor system for use with such landing gear assemblies, as well as a method of monitoring at least one shock-strut stroke characteristic of a landing gear assembly.

During testing of a landing gear assembly, numerous diagnostic tests are performed and analyzed to ensure that the landing gear assembly is suitable for use on an associated aircraft. During testing, a typical manner in which this monitoring is conducted is to employ a linear variable differential transformer (LVDT), but such devices are rather bulky and fragile, thereby preventing permanent installation of the devices for continuous and permanent use on a landing gear assembly. In order to monitor displacement, such as linear translation and angular displacement, of landing gear components on a production aircraft, a robust sensor is required to measure certain landing gear characteristics, such as shock-strut stroke, for example.

BRIEF DESCRIPTION OF THE INVENTION

According to one embodiment, a position sensor system for a landing gear assembly includes a cylinder operatively coupled to an aircraft. Also included is a piston configured to translate within the cylinder. Further included is a pattern disposed on an outer surface of the piston. Yet further included is a scanner operatively coupled to the cylinder and positioned to optically detect the pattern during translation of the piston. Also included is a microprocessor in operative communication with the scanner and configured to receive data from the scanner for conversion to a quantity of movement of the piston relative to the cylinder.

In addition to one or more of the features described above, or as an alternative, further embodiments may include that the scanner is operatively coupled to the cylinder proximate an end of the cylinder.

In addition to one or more of the features described above, or as an alternative, further embodiments may include a plurality of scanners disposed proximate the end of the cylinder at a plurality of circumferentially spaced locations.

In addition to one or more of the features described above, or as an alternative, further embodiments may include that the scanner is disposed within a housing.

In addition to one or more of the features described above, or as an alternative, further embodiments may include that the scanner is operatively coupled to the cylinder at an internal location of the cylinder.

In addition to one or more of the features described above, or as an alternative, further embodiments may include a plurality of scanners disposed at internal locations of the cylinder at a plurality of circumferentially spaced locations.

In addition to one or more of the features described above, or as an alternative, further embodiments may include that the scanner includes a timing mechanism configured to determine a velocity of movement of the piston relative to the cylinder.

In addition to one or more of the features described above, or as an alternative, further embodiments may include that the position sensor system is configured to monitor shock-strut characteristics of the landing gear assembly.

In addition to one or more of the features described above, or as an alternative, further embodiments may include that the pattern is a binary-coded pattern.

In addition to one or more of the features described above, or as an alternative, further embodiments may include that the position sensor system is configured to monitor characteristics of a hydraulic actuator of the landing gear assembly.

According to another embodiment, a method of monitoring at least one shock-strut stroke characteristic of a landing gear assembly is provided. The method includes translating a piston within a cylinder, wherein the piston includes a binary-coded pattern disposed on an outer surface of the piston. The method also includes optically detecting the binary-coded pattern with a scanner operatively coupled to the cylinder as the piston translates. The method further includes communicating data optically detected from the scanner to a microprocessor. The method yet further includes processing the data to determine at least one quantity of movement of the piston relative to the cylinder.

In addition to one or more of the features described above, or as an alternative, further embodiments may include that the scanner includes a timing mechanism, the method further comprising detecting a rate of translation of the piston.

In addition to one or more of the features described above, or as an alternative, further embodiments may include that the at least one quantity of movement detected comprises a length.

In addition to one or more of the features described above, or as an alternative, further embodiments may include that the at least one quantity of movement detected comprises an angle of rotation.

In addition to one or more of the features described above, or as an alternative, further embodiments may include outputting the at least one quantity of movement as a digital readout.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
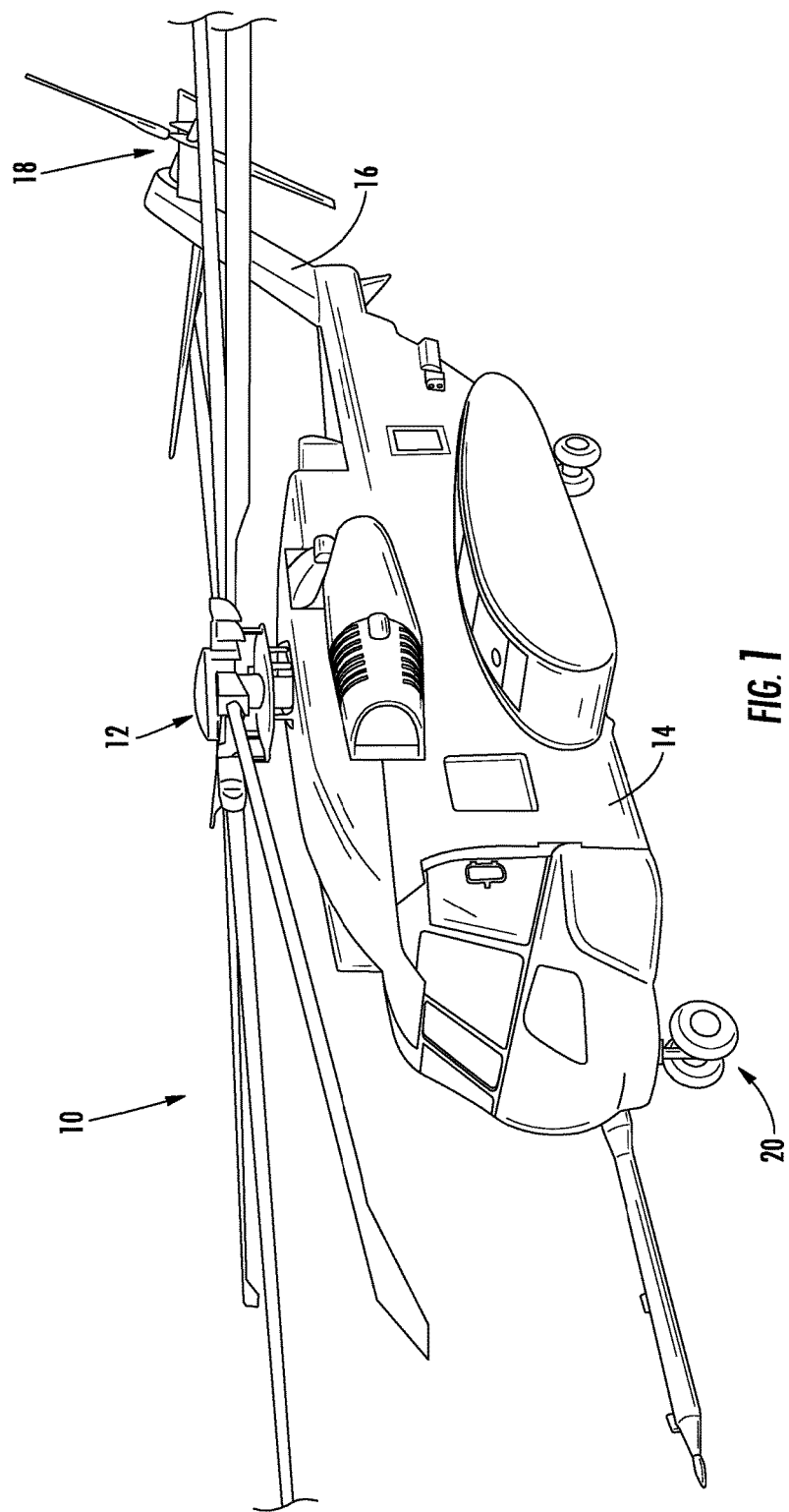
FIG. 1 is a perspective view of a rotary-wing aircraft.

Referring to FIG. 1, schematically illustrated is a rotary-wing aircraft 10 having a main rotor system 12. The aircraft 10 includes an airframe 14 having an extending tail 16 which mounts a tail rotor system 18, such as an anti-torque system. The main rotor assembly 12 is driven through a main power transmission gearbox by one or more engines. The aircraft 10 employs at least one landing gear assembly 20 during a landing procedure and while performing land-based maneuvers on a ground surface. Although a particular helicopter configuration is illustrated and described in the disclosed embodiment, other configurations and/or machines, such as ground vehicles, jet aircraft, turbofan engines, high speed compound rotary wing aircraft with supplemental translational thrust systems, dual contra-rotating, coaxial rotor system aircraft, turbo-props, tilt-rotors and tilt-wing aircraft, and the like may also benefit from the embodiments described herein.

Figure 2:
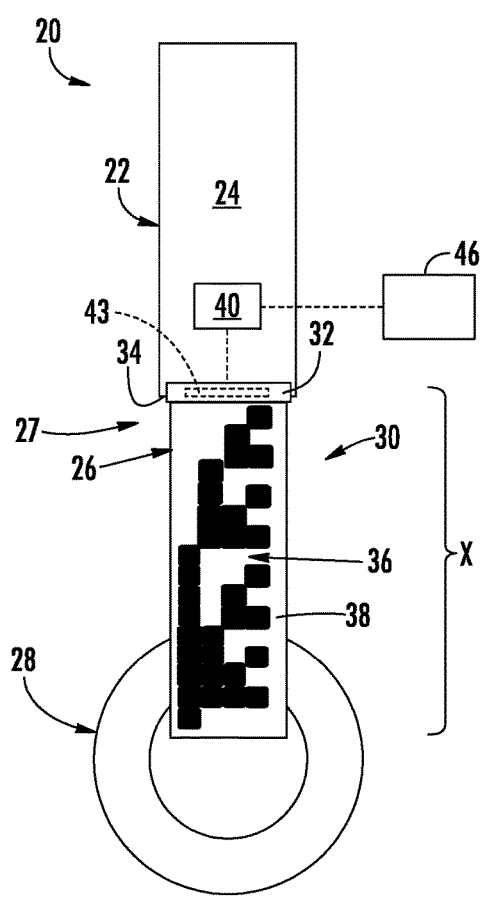
FIG. 2 is a schematic view of a landing gear assembly in a first position.
Figure 3:
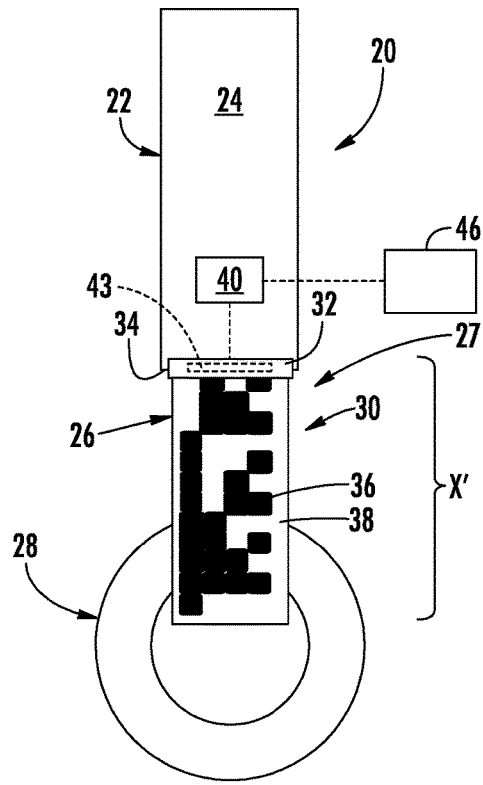
FIG. 3 is a schematic view of the landing gear assembly in a second position.

Referring now to FIGS. 2 and 3, the landing gear assembly 20 is schematically illustrated in greater detail. The landing gear assembly 20 is configured to transition between various conditions, including what is referred to herein as an extended condition (FIG. 2) and a compressed condition (FIG. 3). It is to be appreciated that the illustrated conditions are merely exemplary and may not necessarily depict a fully extended or compressed condition of the landing gear assembly 20. The extreme extended and compressed conditions will vary depending on the particular application and upon the forces applied to the landing gear assembly 20.

The landing gear assembly 20 includes a cylinder 22 that is directly or indirectly coupled to the aircraft in a relatively stationary manner. The cylinder 22 has an outer cylinder surface 24 and an inner cylinder surface (not specifically referenced), with the inner cylinder surface defining an interior chamber of the cylinder 22. Although referenced as a cylinder herein, it can be appreciated that alternate shapes and geometric configurations may be employed, as long as the interior chamber is present. A piston 26 of a hydraulic actuator 27 is directly or indirectly coupled to a wheel 28 of the landing gear assembly 20 and is configured to translate relative to the cylinder 22 upon the application of a force to the wheel 28. Specifically, the piston 26 is in sliding disposition with the cylinder 22 such that a portion of the piston 26 telescopes within the interior chamber of the cylinder 22.

During testing and operation of the landing gear assembly 20, it is advantageous to monitor movement of the piston 26 relative to other components of the landing gear assembly, such as the cylinder 22, for example. The data obtained during monitoring of the movement of the piston 26 provides diagnostic information about various components of the landing gear assembly 20, such as shock-struts that are employed on the landing gear assembly 20 to attenuate energy and produce damping forces during a landing of the aircraft 10, thereby reducing oscillations. The monitored movement of the piston 26 refers to any movement, such as axial translation and angular rotation, for example. In some embodiments, only one of these types of movements is monitored, while other embodiments include monitoring of both types of movements. In contrast to large and fragile, cumbersomely installed, monitoring devices, the embodiments described herein relate to a position sensor system 30 that is configured to be installed on the landing gear assembly in a permanent manner during an entire service life of the aircraft 10.

The position sensor system 30 includes a scanner 32 that is operatively coupled to the cylinder 22. The precise location at which the scanner 32 is mounted to the cylinder 22 may vary. In one embodiment, the scanner 32 is operatively coupled to the cylinder 22 proximate a cylinder end 34. In another embodiment, the scanner 32 is operatively coupled to the inner cylinder surface within the interior chamber of the cylinder 22. In any of the embodiments, the scanner 32 may be located within a housing to provide protection for the scanner 32 from materials that may cause structural damage to the scanner 32 or that may occlude the optical capabilities of the scanner 32. Furthermore, a plurality of scanners may be located in a circumferentially spaced manner around the cylinder end 34 or within the interior chamber of the cylinder 22.

Irrespective of the precise location and configuration of the scanner 32, the scanner 32 is positioned to optically detect a pattern 36 that is disposed on an outer surface 38 of the piston 26. The pattern 36 may be any pattern that is capable of being optically detected by the scanner 32 during movement (e.g., translation, rotation, etc.) of the piston relative to the cylinder 22. For example, piston 26 may move a distance defined as a difference between X in FIG. 2 and X' on FIG. 3. Of course, the distance may also be defined as an angle of rotation of cylinder 33. In one example, the pattern 36 is a binary-coded pattern that contains two bits, with the scanner 32 configured to detect the scanned bit along various portions of the pattern 36 along the outer surface 38 of the piston 26. It is contemplated that code patterns having additional bits may be employed. Additionally, the coded-pattern may be in the form of Gray codes that comprise a binary numeral system where two successive values differ in only one bit (binary digit). Regardless of the precise type of code employed as the pattern 36, the scanner 32 is configured to optically detect the pattern 36 and relay the optically detected data to a microprocessor 40 that the scanner 32 is in operative communication with. It is to be appreciated that the illustrated microprocessor 40 is simply schematically depicted and the location of the microprocessor may vary. In particular, the microprocessor 40 may be integrated within the scanner 32 or may be disposed at a remote location in a wired or wireless communicative state with the scanner 32.

The microprocessor 40 is configured to receive the data obtained by the scanner 32 and is programmed to convert the data to a quantity of movement of the piston 26 relative to the cylinder 22. In this manner, the position sensor system 30 is configured to optically detect raw data during movement of the piston 26 and produce a precise and reliable output of the translational or angular movement. This information is useful to designers and maintenance personnel that benefit from analysis of components of the landing gear assembly 20, such as a shock-strut, as described above in detail.

In addition to the quantity of movement determined by the position sensor system 30, a timing mechanism 43 may be included in the scanner 32 and/or the microprocessor 40 to be used in conjunction with the movement quantity to determine a translational and/or angular velocity of the piston 26 relative to the cylinder 22. The quantity of movement and the velocity may be produced as an output as a digital readout 46 for a user to evaluate.

In addition to the embodiments described above, it is to be appreciated that the position sensor system 30 may be employed to detect and evaluate movement of various other components of the landing gear assembly 20. For example, a hydraulic actuator may benefit from the position sensor system 30. Regardless of the precise components evaluated, the position sensor system 30 is well-suited for permanent installation on the landing gear assembly 20 of the aircraft 10 due to its compact structure that allows it to be installed directly on the cylinder 22 without interfering with the piston 26 and overall operation of the landing gear assembly 20.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A position sensor system for a landing gear assembly comprising:
   a cylinder operatively coupled to an aircraft;
   a piston configured to translate within the cylinder;
   a pattern disposed on an outer surface of the piston;
   a scanner operatively coupled to the cylinder and positioned to optically detect the pattern during translation of the piston, the scanner including a timing mechanism configured to determine a velocity of movement of the piston relative to the cylinder; and
   a microprocessor in operative communication with the scanner and configured to receive data from the scanner for conversion to a quantity of movement of the piston relative to the cylinder.

2. The position sensor system of claim 1, wherein the scanner is operatively coupled to the cylinder proximate an end of the cylinder.

3. The position sensor system of claim 1, further comprising a plurality of scanners disposed proximate an end of the cylinder at a plurality of circumferentially spaced locations.

4. The position sensor system of claim 1, wherein the scanner is disposed within a housing.

5. The position sensor system of claim 1, wherein the scanner is operatively coupled to the cylinder at an internal location of the cylinder.

6. The position sensor system of claim 1, further comprising a plurality of scanners disposed at internal locations of the cylinder at a plurality of circumferentially spaced locations.

7. The position sensor system of claim 1, wherein the position sensor system is configured to monitor shock-strut characteristics of the landing gear assembly.

8. The position sensor system of claim 1, wherein the pattern is a binary-coded pattern.

9. The position sensor system of claim 1, wherein the position sensor system is configured to monitor characteristics of a hydraulic actuator of the landing gear assembly.

10. A method of monitoring at least one shock-strut stroke characteristic of a landing gear assembly, the method comprising:
    translating a piston within a cylinder, wherein the piston includes a binary-coded pattern disposed on an outer surface of the piston;
    optically detecting the pattern with a scanner including a timing mechanism operatively coupled to the cylinder as the piston translates;
    communicating data optically detected from the scanner to a microprocessor; and
    processing the data to determine a quantity of movement and a rate of translation of the piston relative to the cylinder.

11. The method of claim 10, wherein the at least one quantity of movement detected comprises a length.

12. The method of any of claim 10, further comprising outputting the at least one quantity of movement as a digital readout.

* * * * *